Patented Mar. 10, 1953

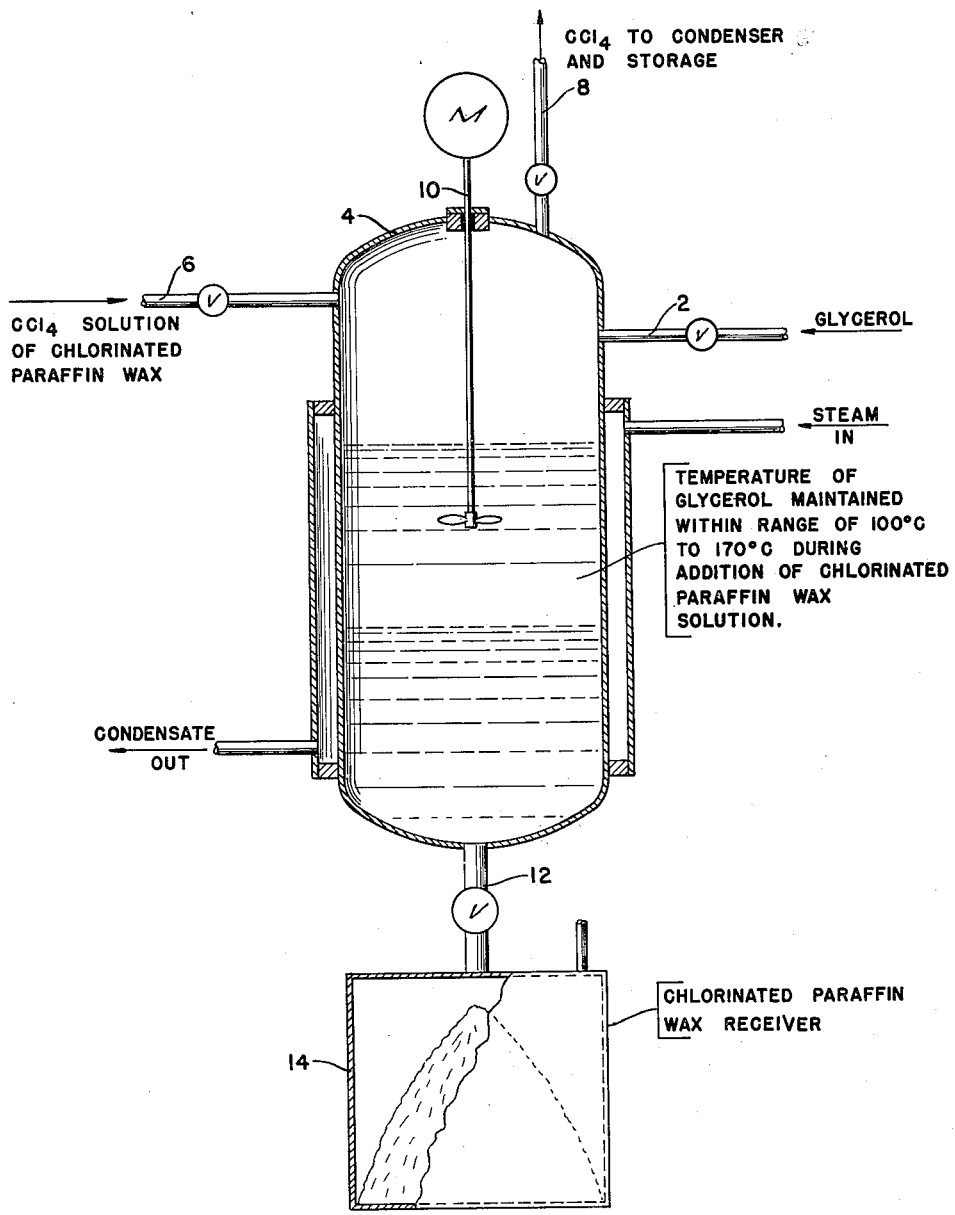

2,631,125

UNITED STATES PATENT OFFICE 2,631,125

STABILIZATION OF CHLORINATED PARAFFIN WAX

Robert C. Danison, Painesville, Ohio, assignor to Diamond Alkali Company, Cleveland, Ohio, a corporation of Delaware Application February 9, 1950, Serial No. 143,359

9 Claims. (Cl. 202—74)

This invention relates to the preparation of normally solid, highly chlorinated paraffin and more particularly relates to improvements in methods of recovering chlorinated paraffin waxes from reaction media subsequent to chlorination.

Highly chlorinated materials of the nature of chlorinated paraffin may be prepared in a variety of ways but are most suitably prepared by dissolving the paraffin desired to be chlorinated in a suitable solvent, such as carbon tetrachloride, and then contacting this solution with elemental chlorine, preferably in the presence of catalytically activating light. The amount of chlorine chemically combined with the paraffin is normally ascertained by well-known means, such as increase in weight, and the chlorine supply is shut off when a satisfactory amount of chlorine has been combined with the paraffin. At this point in the procedure, and especially where a normally solid chlorinated paraffin is desired, the carbon tetrachloride solution becomes a highly viscous, sticky liquid. There remains the necessity of separating the chlorinated paraffin from the carbon tetrachloride in which it is dissolved.

The prior art has normally resorted to steam distillation in order to remove the solvent from the chlorinated paraffin. During such operation, the chlorinated paraffin is in a viscous, semi-molten state. Upon the removal of substantially all of the carbon tetrachloride, the semi-molten chlorinated paraffin is obtained in combination with between 10% and 15% of water. The material may be removed from the still in which the steam distillation has taken place and dried by grinding in a hammer mill swept by warm air or by any other convenient means. This produces a powdered material comprising the finished product.

The procedure of the prior art, however, has many disadvantages which it has been the hope of the art to avoid. The disadvantages arise principally from the necessity of handling relatively large quantities of extremely viscous, sticky material, which material is moreover not entirely non-corrosive to the containers in which it is placed, necessitating the presence of relatively large treating equipment of non-corrosive and thus relatively expensive materials of construction. Moreover, while the products obtained by the steam distillation method possess a stability to heat and light, making them useful for many applications in the arts, these materials are by no means stable for any appreciable period of time at temperatures of the order of 150° C. or higher and thus, their application is considerably limited particularly for combination with thermoplastic materials which normally are molded at temperatures of this order or above.

The method of the present invention is directed to the avoidance of the onerous steam distillation and, moreover, to provision of an improved recovery method which, particularly since it is adapted to be operated on a continuous basis, will necessitate the provision of much smaller equipment for its operation, and thus effect a considerable saving in expense of materials of construction and the like that go into the equipment. A further advantage lies in the recovery of the material in substantially dry, water-free, condition. In addition, a particular advantage of the present invention lies in the fact that chlorinated paraffin recovered in accordance with this method has markedly enhanced stability to heat and light over chlorinated paraffin recovered in accordance with the methods of the prior art.

The chlorinated paraffin recovered in accordance with the method of the present invention is available for use in combination with thermoplastic materials to render the same flame-retardant and is particularly attractive in this use, since combinations of the product of the present invention with thermoplastic materials may suitably be injection molded at ordinary temperatures of this operation, such as of the order of 200° C. and above, without any degradation of the chlorinated paraffin in the mixture, by way of color loss or the like, whereby the finished molded thermoplastic products are flame-retardant and moreover may be colored as well as colorless without concern as to the influence of the chlorinated paraffin thereon.

In accordance with the method of the present invention, a solution of chlorinated paraffin, in a solvent, such as carbon tetrachloride, and chlorinated to the extent to yield a solid material, is introduced into a high boiling liquid, non-solvent for the chlorinated paraffin, at a temperature considerably in excess of the boiling temperature of carbon tetrachloride, whereby the carbon tetrachloride immediately flashes off and the chlorinated paraffin, being insoluble in the said high boiling liquid, deposits on the bottom of the container thereof and may suitably be removed. As examples of high boiling liquids used in this connection, there may be mentioned polyhydroxy organic compounds, examples of which are glycerol, ethylene glycol, propylene glycol, and the like.

While the choice of materials which may be submitted to chlorination to yield a chlorinated paraffin normally solid under ordinary conditions is relatively wide, in general it has been found preferable to select a petroleum-derived or other wax having from 18 to 36 carbon atoms in a straight or branched chain, and suitably a wax which averages of the order of 24 carbon atoms. Waxes of this general class are known to melt in the range of 48°–68° C., suitably 51°–55° C. The extent of chemically combined chlorine necessary to produce material solid at ordinary conditions ranges from 50% upward, though in general at the higher end of the scale, such as above 80% of chlorine, difficulties of attaining more reaction with chlorine are encountered. The most satisfactory materials, both from the standpoint of subsequent use and ease of handling once obtained in solid condition, have chemically combined chlorine ranging from 65–75%, ideally 69–71%.

As noted above, the method of chlorination is not a part of the present invention and comprises simply the contacting of the wax in a suitable solvent at an elevated temperature with elemental chlorine and suitable catalysts, such as light.

While many other solvents will suggest themselves to those skilled in the art, particularly chlorinated lower carbon chain hydrocarbons, including chlorinated ethylenes, such as perchlorethylene and dichlorethylene and the like, carbon tetrachloride is in general preferred for the purpose, in view of easy availability and relative simplicity in handling.

Reference is made to the drawing attached hereto and made a part hereof, which drawing is a diagrammatic sketch of a suitable apparatus for carrying out the method of the present invention. Upon the obtaining of a suitable combination of chlorine and paraffin in carbon tetrachloride and after the chlorine source has been removed, the carbon tetrachloride solution of chlorinated paraffin wax is ready for treatment in accordance with the invention. A suitable polyhydroxy liquid as disclosed above, an example of which is glycerol, is introduced through line 2 into the jacketed tank 4, and is heated to a temperature above the boiling point of carbon tetrachloride, such as a temperature within the range of 100–200° C., by means of steam or other suitable heat transfer means, introduced into the jacket of tank 4 as shown. The carbon tetrachloride-chlorinated paraffin wax solution is introduced into this bath through line 6, preferably at a relatively slow rate so that the carbon tetrachloride will substantially entirely flash off on contact with the glycerol. The vapors of carbon tetrachloride leave tank 4 through line 8, and the chlorinated paraffin drops to the bottom of the tank 4. Upon the completion of addition of a given batch of chlorinated paraffin-carbon tetrachloride solution to a bath of glycerol at the aforesaid elevated temperature, it has been found to be advantageous to stir the mixture, as, for example, with stirrer assembly 10. The deposited chlorinated paraffin on the bottom of the container may then suitably be dumped therefrom through line 12, and is readily recovered at the temperature of operation, free of substantial amounts of grossly entrained glycerol, in receiver 14. A more specific description of the apparatus and conditions as shown in the drawing is given in Example II below.

As noted above, materials recovered in accordance with the method of the present invention have considerably enhanced stability to heat and light both alone and in combination with other materials, such as thermoplastic materials. A convenient method of determining stability with respect to heat is as follows:

A sample of the solid chlorinated material of suitable size is comminuted and placed in a closed test tube fitted with gas inlet and outlet tubes and heated to a temperature of 175° C. for a period of four hours, during which time the test tube is constantly swept with a stream of dry nitrogen. During the heating period, the amount of hydrogen chloride evolved from the sample and removed by the current of dry nitrogen is collected in a washing tower of caustic solution. By suitable titration, the amount of HCl evolved may be determined. The heat stability rating given to the material is based on the percentage of the weight of the sample taken which is recovered as hydrogen chloride. Materials prepared in accordance with the method of the prior art, and particularly materials recovered by the steam distillation discussed above, normally have a rating of about 0.3%. In contrast with these prior art results, materials prepared in accordance with the present invention have a rating of 0.02%–0.07%. Moreover, materials of the present invention have been found to be stable at temperatures of the order of 220° C. in a current of air for a period of one-half hour or more, while the prior art materials severely darkened in color and gave considerable evidence of degradation in a much shorter time at these temperatures.

In order that those skilled in the art may more completely understand the present invention and the preferred methods by which the same may be carried into effect, the following specific examples are offered:

*Example I*

A quantity of glycerine is heated to 120° C. and maintained throughout the entire following procedure between that temperature and 130° C. A carbon tetrachloride solution of chlorinated paraffin having 70% of chemically combined chlorine therein is run in a small stream into the hot glycerine, whereby the carbon tetrachloride flashes off immediately. The chlorinated paraffin forms a layer under the glycerine in the container after the addition of the entire amount of carbon tetrachloride-chlorinated paraffin solution, and after holding the glycerine-chlorinated paraffin mixture in the container for about 20 minutes, the chlorinated paraffin layer is drawn off and separately recovered. The resulting chlorinated paraffin is very light in color and is entirely without odor of carbon tetrachloride.

*Example II*

In this example, the specific conditions and materials shown in the drawing are employed.

A steam-jacketed nickel container 4 of about 2½ gals. capacity, equipped with a motor driven stirrer 10 and a suitable inlet 6 for chlorinated paraffin solution and outlet 8 for distilled carbon tetrachloride, as well as a dump valve in line 12 at the bottom thereof for removal of the separated chlorinated paraffin, is charged with nine pounds of glycerol through line 2, which is then heated with agitation to 100° C., whereupon eight pounds of carbon tetrachloride-chlorinated paraffin solution wherein the chlorinated paraffin contains 70% of chemically combined chlorine, are gradually run in through line 6 over a period of fifty minutes. The temperature is gradually increased during this time to a final temperature of 170° C., which temperature is achieved after an additional five minutes of stirring following the completion of addition of the carbon tetrachloride solution. The chlorinated paraffin, which is a relatively easy flowing liquid at the temperature of this operation, is then withdrawn through the dump valve of the apparatus into the chlorinated paraffin wax receiver 14, and is found upon examination and analysis to contain 0.26% of carbon tetrachloride and to have a stability rating of 0.04% in accordance with the test set forth above. This product has good color and very little odor. While the glycerine is darkened slightly by the treatment, it has been found that it may be used repeatedly in the course of treating additional carbon tetrachloride-chlorinated paraffin solution.

*Example III*

Using the equipment described in Example II and following the same procedure, seven pounds, twelve ounces of a carbon tetrachloride solution of chlorinated paraffin having about 70% of chemically combined chlorine are treated in nine pounds of glycerine at a starting temperature of 125° C. and a finished temperature of 125° C., the time of addition of material being 45 minutes and the material being held in the vessel prior to dumping the chlorinated paraffin for 20 minutes following the complete addition of the solution. The carbon tetrachloride content of the recovered chlorinated paraffin is 1.6% and its stability rating is 0.02%.

*Example IV*

Using the equipment referred to in Example II above, 15 pounds of ethylene glycol are charged to the steam jacketed container and raised to a temperature of 142° C., whereupon ten pounds of carbon tetrachloride solution of chlorinated paraffin having 70% chemically combined chlorine are added over a period of about 35 minutes with stirring during the addition, and maintenance of temperature in the general range of 130–142° C. After all of the material is added, the mixture is further stirred for 20 minutes, and 35 minutes are allowed for settling of chlorinated paraffin in the bottom of the container, after which it is withdrawn. The color of the material is light and compares favorably with the color of the materials described above. Its stability rating is 0.055%.

The present invention may suitably be practiced on a batch or, if desired, on a continuous basis especially since, as noted in the examples above, the glycerine is stable for relatively extended periods of use. Moreover, as will be obvious, the carbon tetrachloride may suitably be recovered in a conventional condenser and reused in processing additional chlorinated paraffin.

While there have been described various embodiments of the invention, the methods described are not intended to be understood as limiting the scope of the invention as it is realized that changes therewithin are possible and it is further intended that each element recited in any of the following claims is to be understood as referring to all equivalent elements for accomplishing susbtantially the same results in substantially the same or equivalent manner, it being intended to cover the invention broadly in whatever form its principle may be utilized.

What is claimed is:

1. The method of recovering chlorinated paraffin wax of enhanced stability from a solution in a solvent which includes the steps of contacting said solution with a liquid polyhydroxy compound chosen from the group of glycerol, ethylene glycol and propylene glycol, at a temperature in excess of the boiling point of said solvent, and separately recovering said chlorinated paraffin freed from said solvent.

2. The method of recovering normally solid chlorinated paraffin wax of enhanced stability from a solution in a solvent which includes the steps of contacting said solution with a liquid material chosen from the group of glycerol, ethylene glycol and propylene glycol, at a temperature in excess of the boiling temperature of said solvent, flashing off said solvent, and separately recovering chlorinated paraffin.

3. The method of recovering chlorinated paraffin wax of enhanced stability having between 50% and 80% of chemically combined chlorine from a solution thereof, which includes the steps of contacting said solution with a liquid substance chosen from the group of glycerol, ethylene glycol and propylene glycol, at a temperature in excess of the boiling temperature of said solvent, flashing off said solvent, and separately recovering said chlorinated paraffin.

4. The method of recovering chlorinated paraffin wax of enhanced stability having between 69% and 71% of chemically combined chlorine therein from a solution in a low boiling chlorinated solvent, which includes the steps of contacting said solution with a liquid substance chosen from the group of glycerol, ethylene glycol and propylene glycol, at a temperature in excess of the boiling point of said solvent, and separately recovering said chlorinated paraffin.

5. The method of recovering chlorinated paraffin wax of enhanced stability having between 50% and 80% of chemically combined chlorine from a solution thereof in a relatively low boiling solvent, which includes the steps of contacting said solution with a liquid substance chosen from the group of glycerol, ethylene glycol and propylene glycol, at a temperature between 100° and 200° C., flashing off said solvent and separately recovering said chlorinated paraffin.

6. The method of recovering chlorinated paraffin wax having between 50% and 80% of chemically combined chlorine from a solution thereof in a relatively low boiling solvent which includes the steps of contacting said solution with liquid glycerol at a temperature between 100° and 200° C., flashing off said solvent and separately recovering said chlorinated paraffin.

7. The method of claim 6 wherein said chlorinated paraffin wax is recovered combined with up to 5% of glycerol.

8. The method of recovering chlorinated paraffin wax having between 50% and 80% of chemically combined chlorine from a solution thereof in a relatively low boiling solvent which includes the steps of contacting said solution with liquid ethylene glycol at a temperature between 100° and 200° C., flashing off said solvent and separately recovering said chlorinated paraffin.

9. The method of claim 8 wherein said chlorinated paraffin wax is recovered combined with up to 5% of ethylene glycol.

ROBERT C. DANISON.

REFERENCES CITED

The following references are of record in the file of this patent:

UNITED STATES PATENTS

| Number | Name | Date |
|---|---|---|
| 2,355,319 | Morris et al. | Aug. 8, 1944 |
| 2,371,644 | Petering | Mar. 20, 1945 |
| 2,396,600 | Pacevitz | Mar. 12, 1946 |
| 2,502,485 | Saunders | Apr. 4, 1950 |